(12) United States Patent
Yu et al.

(10) Patent No.: US 11,463,338 B2
(45) Date of Patent: Oct. 4, 2022

(54) METHOD FOR MEASURING AVAILABLE BANDWIDTH AND COMMUNICATIONS APPARATUS

(71) Applicant: Huawei Technologies Co., Ltd., Shenzhen (CN)

(72) Inventors: Boyuan Yu, Nanjing (CN); Jie Cheng, Shenzhen (CN); Qian Cao, Nanjing (CN); Nu Xia, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/482,042

(22) Filed: Sep. 22, 2021

(65) Prior Publication Data
US 2022/0006717 A1 Jan. 6, 2022

Related U.S. Application Data

(63) Continuation of application No. PCT/CN2020/081330, filed on Mar. 26, 2020.

(30) Foreign Application Priority Data
Mar. 29, 2019 (CN) .......................... 201910251033.6

(51) Int. Cl.
*H04L 43/0882* (2022.01)
*H04L 43/106* (2022.01)
*H04L 43/12* (2022.01)

(52) U.S. Cl.
CPC ........ *H04L 43/0882* (2013.01); *H04L 43/106* (2013.01); *H04L 43/12* (2013.01)

(58) Field of Classification Search
None
See application file for complete search history.

(56) References Cited

U.S. PATENT DOCUMENTS

| 6,614,763 | B1 * | 9/2003 | Kikuchi | ................. | H04L 43/50 709/227 |
| 6,813,244 | B1 * | 11/2004 | He | ....................... | H04L 41/046 370/252 |

(Continued)

FOREIGN PATENT DOCUMENTS

| CN | 101222380 A | 7/2008 |
| CN | 104113446 A | 10/2014 |

(Continued)

OTHER PUBLICATIONS

Chen, Y., et al., "Disscussion of End-to-End Available Network Bandwidth Estimation Methodology," Naval University of Engineering, Wuhan, Computer and Digital Engineering, DOI:10. 3969/j. issn. 1672-9722, vol. 43, No. 11, Nov. 11, 2015, 5 pages.

(Continued)

*Primary Examiner* — Ranodhi Serrao
(74) *Attorney, Agent, or Firm* — Conley Rose, P.C.

(57) ABSTRACT

A method for measuring available bandwidth includes a transmit end that sends a first probe sequence to a receive end, and receives a first available bandwidth measurement result from the receive end, the transmit end determines a second probe sequence based on the first available bandwidth measurement result, where the second probe sequence includes a group of probe packets with increasing sending rates, a range of the sending rates of the second probe sequence is the same as a range of the sending rates of the first probe sequence, the transmit end sends the second probe sequence to the receive end, and receives the second available bandwidth measurement result from the receive end, and the transmit end obtains the available bandwidth based on the second available bandwidth measurement result.

16 Claims, 5 Drawing Sheets

(56) References Cited

U.S. PATENT DOCUMENTS

| | | | |
|---|---|---|---|
| 7,180,858 B1* | 2/2007 | Roy | H04L 43/50 370/252 |
| 7,558,202 B2* | 7/2009 | Luo | H04L 47/283 370/468 |
| 7,660,261 B2* | 2/2010 | Keromytis | H04L 43/0882 370/252 |
| 7,778,179 B2* | 8/2010 | Ekelin | H04L 43/0882 370/252 |
| 9,654,370 B2* | 5/2017 | Welin | H04L 43/0882 |
| 2007/0115849 A1* | 5/2007 | Ekelin | H04L 43/50 370/468 |
| 2007/0217448 A1* | 9/2007 | Luo | H04L 47/283 370/468 |
| 2007/0242616 A1 | 10/2007 | Chang et al. | |
| 2009/0016238 A1* | 1/2009 | Yu | H04L 41/0896 370/252 |
| 2009/0016240 A1* | 1/2009 | Sebastian | H04L 47/10 370/253 |
| 2015/0333993 A1* | 11/2015 | Welin | H04W 24/08 370/252 |
| 2017/0324635 A1 | 11/2017 | Oshiba | |

FOREIGN PATENT DOCUMENTS

| | | |
|---|---|---|
| CN | 104486163 A | 4/2015 |
| CN | 104579812 A | 4/2015 |
| CN | 107332729 A | 11/2017 |
| CN | 107426048 A | 12/2017 |
| CN | 107734537 A | 2/2018 |
| CN | 107872369 A | 4/2018 |
| CN | 108011771 A | 5/2018 |
| GB | 2540568 A | 1/2017 |
| WO | 2014001458 A1 | 1/2014 |

OTHER PUBLICATIONS

Zhang, D., et al, "Self-Loading Decreasing Rate Packet Train Method for Available Bandwidth Estimation," Journal of Software, 2012, Issue 02, 17 pages.

Paul, A., et al, "An Enhanced Available Bandwidth Estimation Technique for an End-to-End Network Path," IEEE Transactions on Network and Service Management, May 2016, 14 pages.

Hu Zhi-Guo et al.,"Current Research and Future Perspective on IP Network Performance Measurement," ISSN 1000-9825, CODEN RUXUEW, Journal of Software, 28(1):105-134, vol. 28, No. I, Jan. 2017, 30 pages.

Riberio, V., et al, "pathChirp: Efficient Available Bandwidth Estimation for Network Path," Presented at Passive and Active Monitoring Workshop (PAM 2003), San Diego, CA, USA, SLAC-PUB-9732, Apr. 2003, 11 pages.

* cited by examiner

1

METHOD FOR MEASURING AVAILABLE BANDWIDTH AND COMMUNICATIONS APPARATUS

CROSS-REFERENCE TO RELATED APPLICATIONS

This is a continuation of International Patent Application No. PCT/CN2020/081330 filed on Mar. 26, 2020, which claims priority to Chinese Patent Application No. 201910251033.6 filed on Mar. 29, 2019. The disclosures of the aforementioned applications are hereby incorporated by reference in their entireties.

TECHNICAL FIELD

This application relates to the field of communications technologies, and in particular, to a method for measuring available bandwidth and a communications apparatus.

BACKGROUND

Available bandwidth (ABW) is a maximum sending rate that a link can provide for other applications without affecting a background traffic sending rate. Accurate measurement of available bandwidth is very important for various network applications.

In the other approaches, to measure available bandwidth, a transmit end sends probe packets with increasing sending rates to a receive end, and after receiving the probe packets, the receive end calculates one-way delays of the probe packets. Because sending rates of initially sent probe packets are less than the available bandwidth of the link, one-way delays of the probe packets are relatively stable, and as sending rates of probe packets constantly increase, the sending rates of the probe packets gradually get close to the available bandwidth of the link, and finally exceed the available bandwidth. As a result, one-way delays increase. The receive end considers a sending rate of a probe packet corresponding to a turning point of the one-way delays from being stable to being increasing as the available bandwidth of the link. After one measurement ends, the receive end sends an available bandwidth measurement result to the transmit end. The transmit end adjusts upper and lower limits of a sending rate of a probe packet based on the available bandwidth measurement result, increases a sampling density near the available bandwidth measurement result, and performs measurement again. Statistics are collected on a plurality of measurement results, to obtain the final available bandwidth.

In other approaches, the transmit end adjusts a range of sending rates of probe packets in subsequent measurement based on the available bandwidth measurement result. Consequently, in a scenario in which background traffic changes relatively fiercely, the range of the sending rates of the probe packets may deviate from a real value of current available bandwidth. Therefore, accuracy of a measurement result is relatively low.

SUMMARY

Embodiments of this application provide a method for measuring available bandwidth, for measuring available bandwidth of a link, to improve measurement accuracy.

According to a first aspect of the embodiments of this application, a method for measuring available bandwidth is provided. The method includes a transmit end sends a first probe sequence to a receive end, and receives a first available bandwidth measurement result returned by the receive end, where the first probe sequence includes a group of probe packets with increasing sending rates, and the first probe sequence is used for determining the first available bandwidth measurement result, the transmit end determines a second probe sequence based on the first available bandwidth measurement result, where the second probe sequence includes a group of probe packets with increasing sending rates, a range of the sending rates of the second probe sequence is the same as a range of the sending rates of the first probe sequence, and the second probe sequence is used for determining a second available bandwidth measurement result, the transmit end sends the second probe sequence to the receive end, and receives the second available bandwidth measurement result returned by the receive end, and the transmit end obtains the available bandwidth, where the available bandwidth is determined based on the second available bandwidth measurement result.

To measure the available bandwidth, the transmit end may send a probe sequence to the receive end. The probe sequence is a group of probe packets with variable rates. A probe packet carries a sending timestamp. After receiving the probe packet, the receive end records a receiving moment, obtains a one-way delay of the probe packet based on the sending timestamp of the probe packet and the receiving moment, and obtains an available bandwidth measurement result of a link between the transmit end and the receive end by determining a variation tendency of one-way delays. To measure the available bandwidth, the transmit end usually sends a plurality of probe sequences to the receive end. In this embodiment of this application, for ease of description, any probe sequence sent by the transmit end to the receive end is denoted as the first probe sequence, and a next probe sequence adjacent to the first probe sequence is denoted as the second probe sequence. After the transmit end sends the first probe sequence to the receive end, the receive end obtains the first available bandwidth measurement result and sends the first available bandwidth measurement result to the transmit end. The transmit end determines the second probe sequence based on the first available bandwidth measurement result, and the range of the sending rates of the second probe sequence is the same as the range of the sending rates of the first probe sequence. The range of the sending rates of the second probe sequence sent by the transmit end to the receive end is the same as the range of the sending rates of the first probe sequence, and the range of the sending rates of the probe sequence is not adjusted based on the available bandwidth measurement result. Therefore, even if in a scenario in which background traffic changes relatively fiercely, a case in which a range of sending rates of a probe sequence deviates from real available bandwidth can be avoided, thereby improving probing accuracy.

In a possible implementation of the first aspect, that the transmit end determines a second probe sequence based on the first available bandwidth measurement result includes that the transmit end determines the second probe sequence including an accurate probe sequence and an inaccurate probe sequence based on the first available bandwidth measurement result, where an increasing speed of sending rates of the accurate probe sequence is less than an increasing speed of sending rates of the inaccurate probe sequence.

According to the method for measuring available bandwidth provided in this embodiment of this application, the second probe sequence determined by the transmit end includes the accurate probe sequence and the inaccurate probe sequence. An increasing speed of sending rates of a plurality of probe packets in the accurate probe sequence is relatively low, to be specific, a probe density is relatively large, so that probing precision can be effectively improved. In addition, because an increasing speed of sending rates of a plurality of probe packets in the inaccurate probe sequence is relatively high, to be specific, a probe density is relatively small, so that impact on a network can be alleviated on a premise that probing accuracy is ensured.

In a possible implementation of the first aspect, the accurate probe sequence includes a plurality of probe packets with sending rates that geometrically increase at a first common ratio $\gamma 1$, and the inaccurate probe sequence includes a plurality of probe packets with sending rates that geometrically increase at a second common ratio $\gamma 2$, where $\gamma 1$ is less than $\gamma 2$.

According to the method for measuring available bandwidth provided in this embodiment of this application, the sending rates of the plurality of probe packets in the accurate probe sequence and the inaccurate probe sequence geometrically increase, so that the impact on the network can be alleviated.

In a possible implementation of the first aspect, the accurate probe sequence includes a plurality of probe packets with sending rates that arithmetically increase at a first common difference d1, and the inaccurate probe sequence includes a plurality of probe packets with sending rates that arithmetically increase at a second common difference d2, where d1 is less than d2.

According to the method for measuring available bandwidth provided in this embodiment of this application, the sending rates of the plurality of probe packets in the accurate probe sequence and the inaccurate probe sequence arithmetically increase, so that the impact on the network can be alleviated, and diversity of solution implementation can also be increased.

In a possible implementation of the first aspect, the accurate probe sequence includes a plurality of probe packets with a sending rate range including the first available bandwidth measurement result.

According to the method for measuring available bandwidth provided in this embodiment of this application, the transmit end determines the accurate probe sequence with a sending rate range including the first available bandwidth measurement result, to improve the probing precision.

In a possible implementation of the first aspect, the accurate probe sequence includes the plurality of probe packets with the sending rate range taking the first available bandwidth measurement result as a middle point.

According to the method for measuring available bandwidth provided in this embodiment of this application, the transmit end determines the plurality of probe packets with the sending rate range taking the first available bandwidth measurement result as the middle point as the accurate probe sequence, to improve the probing precision.

In a possible implementation of the first aspect, after the transmit end receives the second available bandwidth measurement result returned by the receive end, the method further includes that the transmit end determines a third probe sequence based on the second available bandwidth measurement result. A range of sending rates of the third probe sequence is the same as the range of the sending rates of the first probe sequence. The third probe sequence is used for determining a third available bandwidth measurement result. The transmit end sends the third probe sequence to the receive end, and receives the third available bandwidth measurement result returned by the receive end. The third available bandwidth measurement result is used for determining the available bandwidth.

According to the method for measuring available bandwidth provided in this embodiment of this application, the transmit end updates the accurate probe sequence based on the third available bandwidth measurement result returned by the receive end. A plurality of available bandwidth measurement results can be obtained, so that the probing accuracy can be improved.

In a possible implementation of the first aspect, that the transmit end obtains the available bandwidth includes that the transmit end determines the available bandwidth based on a statistical value of the plurality of available bandwidth measurement results returned by the receive end, or the transmit end receives the available bandwidth sent by the receive end, where the available bandwidth is determined based on the statistical value of the plurality of available bandwidth measurement results.

According to the method for measuring available bandwidth provided in this embodiment of this application, the available bandwidth may be determined by the transmit end based on the statistical value of the plurality of available bandwidth measurement results, or may be sent by the receive end to the transmit end, so that flexibility of solution implementation is increased.

In a possible implementation of the first aspect, that the transmit end determines the available bandwidth of a link based on the available bandwidth measurement results includes that the transmit end determines the available bandwidth based on an average value of the plurality of available bandwidth measurement results returned by the receive end.

According to the method for measuring available bandwidth provided in this embodiment of this application, a specific implementation in which the transmit end determines the available bandwidth based on the available bandwidth measurement results is provided, to enhance solution practicability.

In a possible implementation of the first aspect, that the transmit end determines the available bandwidth based on a statistical value of the plurality of available bandwidth measurement results returned by the receive end includes, when a preset probe stop condition is met, the transmit end determines the available bandwidth. The preset probe stop condition includes probe duration of the probe sequences sent by the transmit end reaches a first preset threshold, a quantity of available bandwidth measurement results obtained by the transmit end reaches a second preset threshold, a difference between two successive available bandwidth measurement results is less than a third preset threshold, or a variance of a preset quantity of a plurality of successive available bandwidth measurement results is less than a fourth preset threshold.

According to the method for measuring available bandwidth provided in this embodiment of this application, a plurality of probe stop conditions are provided, to increase diversity of solution implementation.

According to a second aspect of the embodiments of this application, a method for measuring available bandwidth is provided. The method includes a receive end determines a first available bandwidth measurement result based on a first probe sequence sent by a transmit end, and sends the first available bandwidth measurement result to the transmit end, where the first probe sequence includes a group of probe packets with increasing sending rates, and the first available bandwidth measurement result is used for determining a second probe sequence, the receive end receives the second probe sequence sent by the transmit end, where the second probe sequence includes a group of probe packets with increasing sending rates, and a range of the sending rates of the second probe sequence is the same as a range of the sending rates of the first probe sequence, and the receive end determines a second available bandwidth measurement result based on the second probe sequence, and sends the second available bandwidth measurement result to the transmit end, where the second available bandwidth measurement result is used for determining the available bandwidth.

That the receive end determines an available bandwidth measurement result based on a probe sequence sent by the transmit end includes that the receive end obtains a receiving moment of the probe sequence, the receive end determines one-way delays of the probe sequence based on the probe sequence and the receiving moment, the receive end determines, based on the one-way delays of the probe sequence, a target probe packet corresponding to a turning point of the one way delays, and the receive end determines the available bandwidth measurement result based on the target probe packet.

After receiving the first probe sequence sent by the transmit end, the receive end records a receiving moment of each probe packet, and calculates a one-way delay of the probe packet based on a sending timestamp carried in the probe packet and the receiving moment. The receive end searches for the turning point of the one-way delays from being stable to being increasing by determining a variation tendency of delays, and uses a sending rate of the probe packet corresponding to the turning point as the available bandwidth measurement result of a link, and the receive end sends the available bandwidth measurement result to the transmit end. To measure the available bandwidth, the receive end may usually receive a plurality of probe sequences sent by the transmit end. In this embodiment of this application, for ease of description, any probe sequence sent by the transmit end to the receive end is denoted as the first probe sequence, and a next probe sequence adjacent to the first probe sequence is denoted as the second probe sequence. The receive end receives the second probe sequence sent by the transmit end. Because the range of the sending rates of the second probe sequence is the same as the range of the sending rates of the first probe sequence, and the range of the sending rates of the probe sequence is not adjusted based on the available bandwidth measurement result, even if in a scenario in which background traffic changes relatively fiercely, a case in which a range of sending rates of a probe sequence deviates from real available bandwidth can be avoided, thereby improving probing accuracy.

In a possible implementation of the second aspect, that the receive end receives the second probe sequence sent by the transmit end includes that the receive end receives the second probe sequence including an accurate probe sequence and an inaccurate probe sequence, where an increasing speed of sending rates of the accurate probe sequence is less than an increasing speed of sending rates of the inaccurate probe sequence.

According to the method for measuring available bandwidth provided in this embodiment of this application, the second probe sequence includes the accurate probe sequence and the inaccurate probe sequence. An increasing speed of sending rates of a plurality of probe packets in the accurate probe sequence is relatively low, to be specific, a probe density is relatively large, so that probing precision can be effectively improved. In addition, because an increasing speed of sending rates of a plurality of probe packets in the inaccurate probe sequence is relatively high, to be specific, a probe density is relatively small, so that impact on a network can be alleviated on a premise that probing accuracy is ensured.

In a possible implementation of the second aspect, the accurate probe sequence includes a plurality of probe packets with sending rates that geometrically increase at a first common ratio γ1, and the inaccurate probe sequence includes a plurality of probe packets with sending rates that geometrically increase at a second common ratio γ2, where γ1 is less than γ2.

According to the method for measuring available bandwidth provided in this embodiment of this application, the sending rates of the plurality of probe packets in the accurate probe sequence and the inaccurate probe sequence geometrically increase, so that the impact on the network can be alleviated.

In a possible implementation of the second aspect, the accurate probe sequence includes a plurality of probe packets with sending rates that arithmetically increase at a first common difference d1, and the inaccurate probe sequence includes a plurality of probe packets with sending rates that arithmetically increase at a second common difference d2, where d1 is less than d2.

According to the method for measuring available bandwidth provided in this embodiment of this application, the sending rates of the plurality of probe packets in the accurate probe sequence and the inaccurate probe sequence arithmetically increase, so that the impact on the network can be alleviated, and diversity of solution implementation can also be increased.

In a possible implementation of the second aspect, the accurate probe sequence includes a plurality of probe packets with a sending rate range including the first available bandwidth measurement result.

According to the method for measuring available bandwidth provided in this embodiment of this application, the second probe sequence received by the receive end includes the accurate probe sequence with a sending rate range including the first available bandwidth measurement result, to improve the probing precision.

In a possible implementation of the second aspect, the accurate probe sequence includes the plurality of probe packets with the sending rate range taking the first available bandwidth measurement result as a middle point.

According to the method for measuring available bandwidth provided in this embodiment of this application, the second probe sequence received by the receive end includes the accurate probe sequence with the sending rate range taking the first available bandwidth measurement result as the middle point, to improve the probing precision.

In a possible implementation of the second aspect, after the receive end determines the second available bandwidth measurement result based on the second probe sequence and sends the second available bandwidth measurement result to the transmit end, the method further includes that the receive end receives a third probe sequence sent by the transmit end. The third probe sequence is determined based on the second available bandwidth measurement result. A range of sending rates of the third probe sequence is the same as the range of the sending rates of the first probe sequence. The receive end determines a third available bandwidth measurement result based on the third probe sequence, and sends the third available bandwidth measurement result to the transmit end. The third available bandwidth measurement result is used for determining the available bandwidth.

According to the method for measuring available bandwidth provided in this embodiment of this application, the receive end may obtain the third available bandwidth measurement result based on the third probe sequence, to obtain a plurality of available bandwidth measurement results, thereby improving the probing accuracy.

In a possible implementation of the second aspect, the method further includes that the receive end determines the available bandwidth based on a statistical value of the plurality of available bandwidth measurement results, and sends the available bandwidth to the transmit end.

According to the method for measuring available bandwidth provided in this embodiment of this application, the receive end may determine the available bandwidth based on the statistical value of the plurality of available bandwidth measurement results, and send the available bandwidth to the transmit end, so that flexibility of solution implementation is increased.

In a possible implementation of the second aspect, that the receive end determines the available bandwidth based on a statistical value of the plurality of available bandwidth measurement results includes, when a preset probe stop condition is met, the receive end determines the available bandwidth based on the statistical value of the plurality of available bandwidth measurement results. The preset probe stop condition includes probe duration of the probe sequences sent by the transmit end reaches a first preset threshold, a quantity of available bandwidth measurement results obtained by the transmit end reaches a second preset threshold, a difference between two successive available bandwidth measurement results is less than a third preset threshold, or a variance of a preset quantity of a plurality of successive available bandwidth measurement results is less than a fourth preset threshold.

According to the method for measuring available bandwidth provided in this embodiment of this application, a plurality of probe stop conditions are provided, to increase diversity of solution implementation.

According to a third aspect of the embodiments of this application, a communications device is provided and includes a transceiver unit, a determining unit, and an obtaining unit. The transceiver unit is configured to send a first probe sequence to a receive end, and receive a first available bandwidth measurement result returned by the receive end, where the first probe sequence includes a group of probe packets with increasing sending rates, and the first probe sequence is used for determining the first available bandwidth measurement result. The determining unit is configured to determine a second probe sequence based on the first available bandwidth measurement result, where the second probe sequence includes a group of probe packets with increasing sending rates, a range of the sending rates of the second probe sequence is the same as a range of the sending rates of the first probe sequence, and the second probe sequence is used for determining a second available bandwidth measurement result. The transceiver unit is further configured to send the second probe sequence to the receive end, and receive the second available bandwidth measurement result returned by the receive end. The obtaining unit is configured to obtain the available bandwidth, where the available bandwidth is determined based on the second available bandwidth measurement result.

In a possible implementation of the third aspect, the determining unit is further configured to determine the second probe sequence including an accurate probe sequence and an inaccurate probe sequence based on the first available bandwidth measurement result. An increasing speed of sending rates of the accurate probe sequence is less than an increasing speed of sending rates of the inaccurate probe sequence.

In a possible implementation of the third aspect, the determining unit is further configured to determine a third probe sequence based on the second available bandwidth measurement result. A range of sending rates of the third probe sequence is the same as the range of the sending rates of the first probe sequence. The third probe sequence is used for determining a third available bandwidth measurement result. The transceiver unit is further configured to send the third probe sequence to the receive end, and receive the third available bandwidth measurement result returned by the receive end. The third available bandwidth measurement result is used for determining the available bandwidth.

In a possible implementation of the third aspect, the determining unit is further configured to determine the available bandwidth based on a statistical value of the plurality of available bandwidth measurement results returned by the receive end, or the transceiver unit is further configured to receive the available bandwidth sent by the receive end, where the available bandwidth is determined based on the statistical value of the plurality of available bandwidth measurement results.

In a possible implementation of the third aspect, the determining unit is further configured to determine, by the transceiver unit, the available bandwidth when a preset probe stop condition is met. The preset probe stop condition includes probe duration of the probe sequences sent by the transceiver unit reaches a first preset threshold, a quantity of available bandwidth measurement results obtained by the transceiver unit reaches a second preset threshold, a difference between two successive available bandwidth measurement results is less than a third preset threshold, or a variance of a preset quantity of a plurality of successive available bandwidth measurement results is less than a fourth preset threshold.

According to a fourth aspect of the embodiments of this application, a communications device is provided and includes a determining unit, a receiving unit, and a sending unit. The determining unit is configured to determine a first available bandwidth measurement result based on a first probe sequence sent by a transmit end, and send the first available bandwidth measurement result to the transmit end, where the first probe sequence includes a group of probe packets with increasing sending rates, and the first available bandwidth measurement result is used for determining a second probe sequence. The receiving unit is configured to receive the second probe sequence sent by the transmit end, where the second probe sequence includes a group of probe packets with increasing sending rates, and a range of the sending rates of the second probe sequence is the same as a range of the sending rates of the first probe sequence. The determining unit is further configured to determine a second available bandwidth measurement result based on the second probe sequence. The sending unit is configured to send the second available bandwidth measurement result to the transmit end, where the second available bandwidth measurement result is used for determining the available bandwidth.

In a possible implementation of the fourth aspect, the receiving unit is further configured to receive the second probe sequence including an accurate probe sequence and an inaccurate probe sequence. An increasing speed of sending rates of the accurate probe sequence is less than an increasing speed of sending rates of the inaccurate probe sequence.

In a possible implementation of the fourth aspect, the receiving unit is further configured to receive a third probe sequence sent by the transmit end. The third probe sequence is determined based on the second available bandwidth measurement result. A range of sending rates of the third probe sequence is the same as the range of the sending rates of the first probe sequence. The determining unit is further configured to determine a third available bandwidth measurement result based on the third probe sequence. The sending unit is further configured to send the third available bandwidth measurement result to the transmit end. The third available bandwidth measurement result is used for determining the available bandwidth.

In a possible implementation of the fourth aspect, the determining unit is further configured to determine the available bandwidth based on a statistical value of the plurality of available bandwidth measurement results, and send the available bandwidth to the transmit end.

In a possible implementation of the fourth aspect, the determining unit is further configured to determine, by the transmit end, the available bandwidth based on the statistical value of the plurality of available bandwidth measurement results when a preset probe stop condition is met. The preset probe stop condition includes probe duration of the probe sequences sent by the transmit end reaches a first preset threshold, a quantity of available bandwidth measurement results obtained by the transmit end reaches a second preset threshold, a difference between two successive available bandwidth measurement results is less than a third preset threshold, or a variance of a preset quantity of a plurality of successive available bandwidth measurement results is less than a fourth preset threshold.

According to a fifth aspect of the embodiments of this application, a communications device is provided, including a processor and a network interface. The network interface is configured to receive and send data. The processor is configured to perform the method in the first aspect and the implementations of the first aspect.

According to a sixth aspect of the embodiments of this application, a communications device is provided, including a processor and a network interface. The network interface is configured to receive and send data. The processor is configured to perform the method in the second aspect and the implementations of the second aspect.

According to a seventh aspect of the embodiments of this application, a computer program product is provided, including instructions. When the computer program product is run on a computer, the computer is enabled to perform the method in the first aspect and the second aspect and the implementations of the first aspect and the second aspect.

According to an eighth aspect of the embodiments of this application, a computer-readable storage medium is provided. The computer-readable storage medium stores instructions. When the instructions are run on a computer, the method in the first aspect and the second aspect and the implementations of the first aspect and the second aspect in the embodiments of this application is performed.

According to a ninth aspect of the embodiments of this application, a communications system is provided, including the communications device in the third aspect, and the communications device in the fourth aspect.

It can be learned from the foregoing technical solutions that, the embodiments of this application have the following advantages.

In the method for measuring available bandwidth provided in the embodiments of this application, the range of the sending rates of the second probe sequence sent by the transmit end to the receive end is the same as the range of the sending rates of the first probe sequence, and the range of the sending rates of the probe sequence is not adjusted based on the available bandwidth measurement result. Therefore, even if in a scenario in which background traffic changes relatively fiercely, a case in which a range of sending rates of a probe sequence deviates from real available bandwidth can be avoided, thereby improving probing accuracy. Moreover, a probe sequence may further include an accurate probe interval determined in the probe sequence based on an available bandwidth measurement result, to improve measurement precision. Therefore, this solution can ensure the measurement accuracy in a scenario in which background traffic changes relatively fiercely.

DESCRIPTION OF EMBODIMENTS

Embodiments of this application provide a method for measuring available bandwidth, to improve accuracy of measuring available bandwidth.

An idea of an algorithm for measuring available bandwidth by using a packet rate model is, when sending rates of probe packets are less than available bandwidth, one-way delays of the probe packets are relatively stable, and as sending rates of probe packets constantly increase, the sending rates of the probe packets gradually get close to the available bandwidth of a link, and finally exceed the available bandwidth. As a result, the one-way delays change from being stable to being increasing. A turning point of the one-way delays from being stable to being increasing is searched for by determining a variation tendency of delays, and a sending rate of a probe packet corresponding to the turning point may be used as an available bandwidth measurement result of the link.

Figure 1:
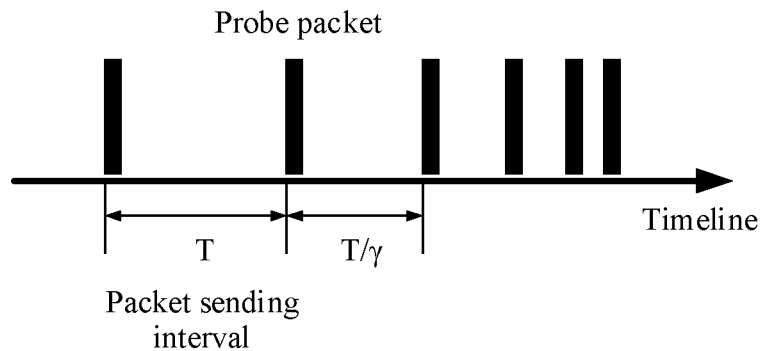
FIG. 1 is a schematic diagram of a probe sequence.

During actual application, a transmit end sends a probe sequence to a receive end. The probe sequence is a group of probe packets with increasing sending rates. A probe sequence shown in FIG. 1 is described below. FIG. 1 is a schematic diagram of a probe sequence. The probe sequence is a group of probe packets with sending rates growing exponentially. To be specific, the sending rates of the probe packets geometrically increase. A common ratio is a spread factor (SF) $\gamma$, which is a ratio of sending rates of two successive probe packets. A value of $\gamma$ is greater than 1. In a possible implementation, sizes of probe packets are the same, and sending intervals geometrically decrease. A common ratio is $1/\gamma$. As shown in FIG. 1, a first packet sending interval is T, and a second packet sending interval is $T/\gamma$. A probe packet carries a sending timestamp. After receiving the probe packet, a receive end records a receiving moment, and calculates a one-way delay of the probe packet based on the sending timestamp carried in the probe packet and the receiving moment of the probe packet. The receive end determines an available bandwidth measurement result based on a sending rate of a probe packet corresponding to a turning point of one-way delays from being stable to being increasing. The receive end feeds back the available bandwidth measurement result to a transmit end. The transmit end adjusts upper and lower limits of a sending rate of a probe packet based on the available bandwidth measurement result, increases a sampling density near the available bandwidth measurement result, and performs measurement again. Statistics are collected on a plurality of measurement results. A final available bandwidth value is determined based on a statistical value of the plurality of available bandwidth measurement results.

Figure 2:
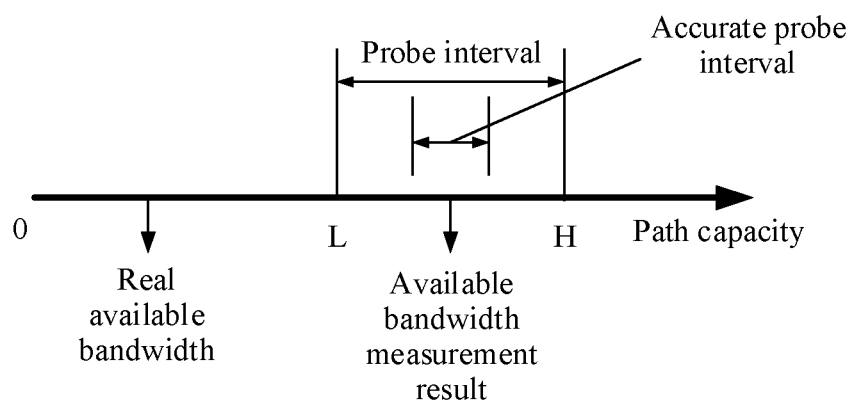
FIG. 2 is a schematic diagram of available bandwidth and a probe interval.

However, when available bandwidth is measured by using the foregoing method, a range of sending rates of a probe sequence for next measurement depends on a last measurement result. Referring to FIG. 2, the transmit end determines, based on the available bandwidth measurement result, that an upper limit and a lower limit of a probe interval for next measurement are respectively L and H, and increases a probe density near the available bandwidth measurement result to perform accurate probing. However, if background traffic of a current link changes relatively fiercely, an available bandwidth measurement result measured last time deviates relatively greatly from a real value of current available bandwidth, and the range of the sending rates of the probe sequence for next measurement deviates from the real value of the current available bandwidth. As shown in FIG. 2, the transmit end performs sampling test only in a rate interval that deviates from the current real available bandwidth, and finally an incorrect result is converged, and accuracy of a measurement result is reduced.

The embodiments of this application provide a method for measuring available bandwidth, for measuring available bandwidth of a link, to improve measurement accuracy.

To make the disclosure objectives, features, and advantages of this application clearer and more comprehensible, the following clearly describes the technical solutions in the embodiments of this application with reference to the accompanying drawings in the embodiments of this application. The embodiments described in the following are merely a part rather than all of the embodiments of this application. All other embodiments obtained by persons of ordinary skill in the art based on the embodiments of this application without creative efforts shall fall within the protection scope of this application.

Figure 3:
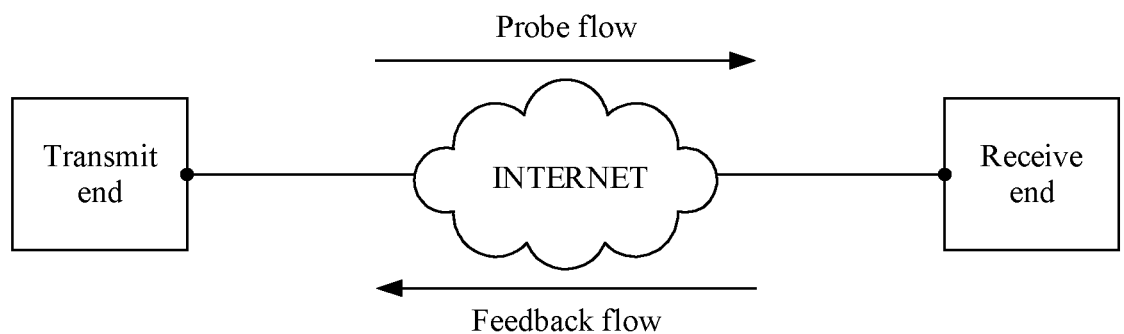
FIG. 3 is a schematic structural diagram of a link according to an embodiment of this application.

The following first describes some possible application scenarios related to the technical solutions of the embodiments of this application by using examples with reference to FIG. 3. FIG. 3 is a schematic structural diagram of a link according to an embodiment of this application.

A method for measuring available bandwidth in this application may be applied to all devices having a bandwidth measurement requirement. This is not limited in the embodiments of this application. A specific application scenario may be a software-defined wide area network (SD-WAN) scenario, an overlay network scenario, or the like. A transmit end and a receive end may be a router, a gateway, a server, or the like. A specific device form of the transmit end and the receive end is not limited in the embodiments of this application. For example, in the SD-WAN scenario, the transmit end and the receive end may be an access router (AR) or customer premise equipment (CPE) of a corporate headquarter or branch, and in the overlay network scenario, the transmit end and the receive end may be a server in a point of presence (POP), or the like.

Figure 4:
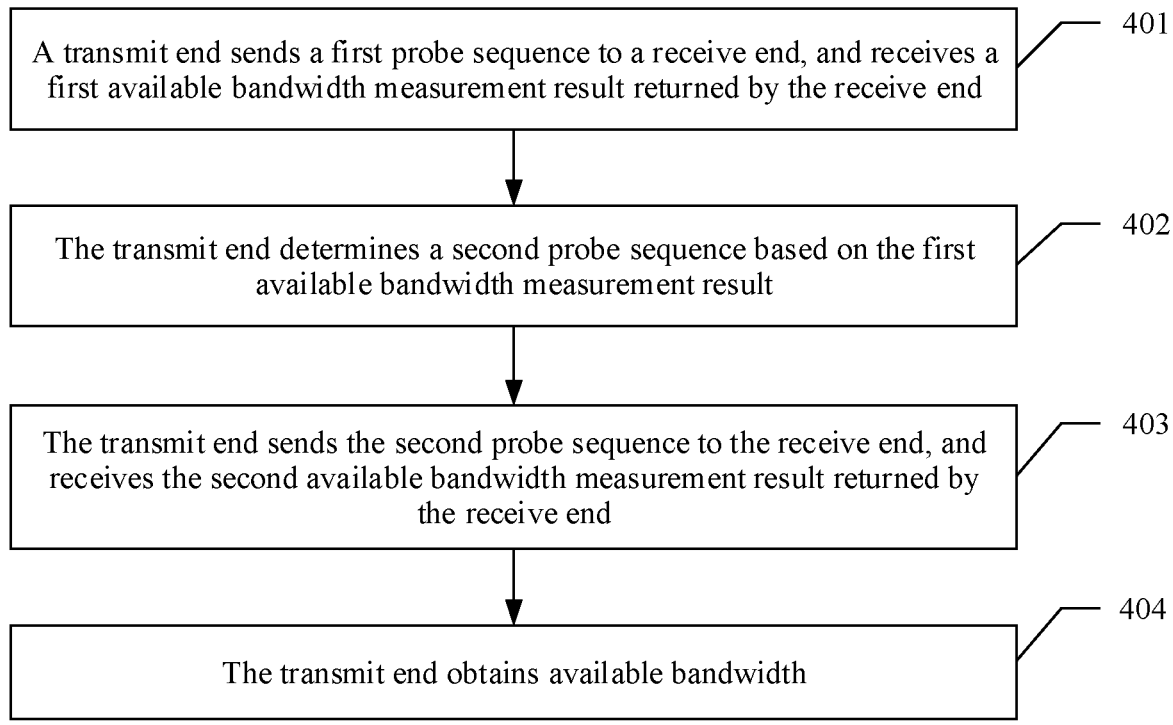
FIG. 4 is a schematic diagram of an embodiment of a method for measuring available bandwidth according to an embodiment of this application.

For ease of better understanding and implementation of the foregoing solutions in the embodiments of this application, the following uses some specific application scenarios for description. Based on the network link structure shown in FIG. 3, FIG. 4 is a schematic diagram of an embodiment of a method for measuring available bandwidth according to an embodiment of this application. The method for measuring available bandwidth in this embodiment of this application may include the following content.

401. A transmit end sends a first probe sequence to a receive end, and receives a first available bandwidth measurement result returned by the receive end.

To measure the available bandwidth of a link, the transmit end usually sends a plurality of probe sequences to the receive end. In this embodiment of this application, for ease of description, any probe sequence sent by the transmit end to the receive end is denoted as the first probe sequence, and a next probe sequence adjacent to the first probe sequence is denoted as a second probe sequence. The transmit end sends the first probe sequence to the receive end. The first probe sequence is a group of probe packets with variable rates, and is usually a group of probe packets with increasing sending rates. A probe packet carries a sending timestamp. The first probe sequence is used for determining the first available bandwidth measurement result. There is a plurality of manners in which sending rates of probe packets in a probe sequence increase. Optionally, sizes of the probe packets in the probe sequence are the same, and packet sending intervals gradually decrease. To be specific, the sending rates of the probe packets gradually increase. Optionally, the sending rates of the probe packets geometrically increase. Optionally, the sending rates of the probe packets arithmetically increase.

After receiving a probe packet, the receive end records a receiving moment, and calculates a one-way delay of the probe packet based on a sending timestamp carried in the probe packet and the receiving moment. The receive end searches for a turning point of one-way delays from being stable to being increasing by determining a variation tendency of delays, and uses a sending rate of a probe packet corresponding to the turning point as an available bandwidth measurement result of the link, and the receive end sends the available bandwidth measurement result to the transmit end.

402. The transmit end determines the second probe sequence based on the first available bandwidth measurement result.

After receiving the first available bandwidth measurement result, the transmit end determines, based on the first available bandwidth measurement result, the second probe sequence for next measurement. To be specific, the transmit end determines sending rates of probe packets in the second probe sequence. The second probe sequence includes a group of probe packets with increasing sending rates. A range of the sending rates of the second probe sequence is the same as a range of the sending rates of the first probe sequence. The second probe sequence is used for determining a second available bandwidth measurement result. Optionally, the transmit end determines the second probe sequence including an accurate probe sequence and an inaccurate probe sequence based on the first available bandwidth measurement result. An increasing speed of sending rates of the accurate probe sequence is less than an increasing speed of sending rates of the inaccurate probe sequence. To be specific, a probe density of the accurate probe sequence is greater than a probe density of the inaccurate probe sequence. Optionally, the accurate probe sequence includes a plurality of probe packets with sending rates that geometrically increase at a first common ratio γ1, and the inaccurate probe sequence includes a plurality of probe packets with sending rates that geometrically increase at a second common ratio γ2, where γ1 is less than γ2. Optionally, the accurate probe sequence includes a plurality of probe packets with sending rates that arithmetically increase at a first common difference d1. Optionally, the inaccurate probe sequence includes a plurality of probe packets with sending rates that arithmetically increase at a second common difference d2, where d1 is less than d2. Measurement precision can be improved by disposing the accurate probe sequence.

403. The transmit end sends the second probe sequence to the receive end, and receives the second available bandwidth measurement result returned by the receive end.

The transmit end sends the second probe sequence determined in step 402 to the receive end. After receiving a probe packet, the receive end records a receiving moment, and calculates a one-way delay of the probe packet based on a sending timestamp carried in the probe packet and the receiving moment. The receive end searches for a turning point of one-way delays from being stable to being increasing by determining a variation tendency of delays, and uses a sending rate of a probe packet corresponding to the turning point as the second available bandwidth measurement result of the link, and the receive end sends the second available bandwidth measurement result to the transmit end.

It should be noted that, the transmit end may repeatedly perform step 403, in other words, send a probe sequence to the receive end for a plurality of times, and obtain available bandwidth measurement results returned by the receive end. A specific quantity of times of execution is not limited herein.

404. The transmit end obtains the available bandwidth.

The available bandwidth may be determined based on the second available bandwidth measurement result. The transmit end may obtain the available bandwidth. Optionally, the transmit end calculates the available bandwidth based on the second available bandwidth measurement result. Optionally, the transmit end receives the available bandwidth sent by the receive end, where the available bandwidth is determined by the receive end based on the second available bandwidth measurement result. A specific manner of obtaining the available bandwidth is not limited herein.

Optionally, the plurality of available bandwidth measurement results may be all available bandwidth measurement results, or may be all available bandwidth measurement results except the first available bandwidth measurement result. The first available bandwidth measurement result herein is a measurement result obtained based on the first probe sequence sent by the transmit end. To be specific, the first available bandwidth measurement result may or may not be selected. The plurality of available bandwidth measurement results may alternatively be a preset quantity of a plurality of available bandwidth measurement results obtained most recently. This is not limited herein.

Optionally, determining the available bandwidth based on a statistical value of the plurality of available bandwidth measurement results may be directly using the statistical value of the plurality of available bandwidth measurement results as the available bandwidth, where the statistical value includes a median value, an average value, or the like, or correcting the statistical value of the plurality of available bandwidth measurement results, and using a value obtained after correction as the available bandwidth, where a correction method is, for example, multiplying the statistical value by a correction coefficient or adding a correction value to the statistical value, and this is not limited herein.

Optionally, when a preset probe stop condition is met, the transmit end determines the available bandwidth of the link based on the available bandwidth measurement results. The preset probe stop condition may be probe duration of the probe sequences sent by the transmit end reaches a first preset threshold, a quantity of available bandwidth measurement results obtained by the transmit end reaches a second preset threshold, a difference between two successive available bandwidth measurement results is less than a third preset threshold, a variance of a preset quantity of a plurality of successive available bandwidth measurement results is less than a fourth preset threshold, or the like. A specific probe stop condition is not limited herein.

In the method for measuring available bandwidth provided in this embodiment of this application, the range of the sending rates of the second probe sequence sent by the transmit end to the receive end is the same as the range of the sending rates of the first probe sequence, and the range of the sending rates of the probe sequence is not adjusted based on the available bandwidth measurement result. Therefore, even if in a scenario in which background traffic changes relatively fiercely, a case in which a range of sending rates of a probe sequence deviates from real available bandwidth can be avoided, thereby improving probing accuracy. Moreover, a probe sequence may further include an accurate probe interval determined in the probe sequence based on an available bandwidth measurement result, to improve measurement precision. Therefore, this solution can ensure the measurement accuracy in a scenario in which background traffic changes relatively fiercely.

Figure 5:
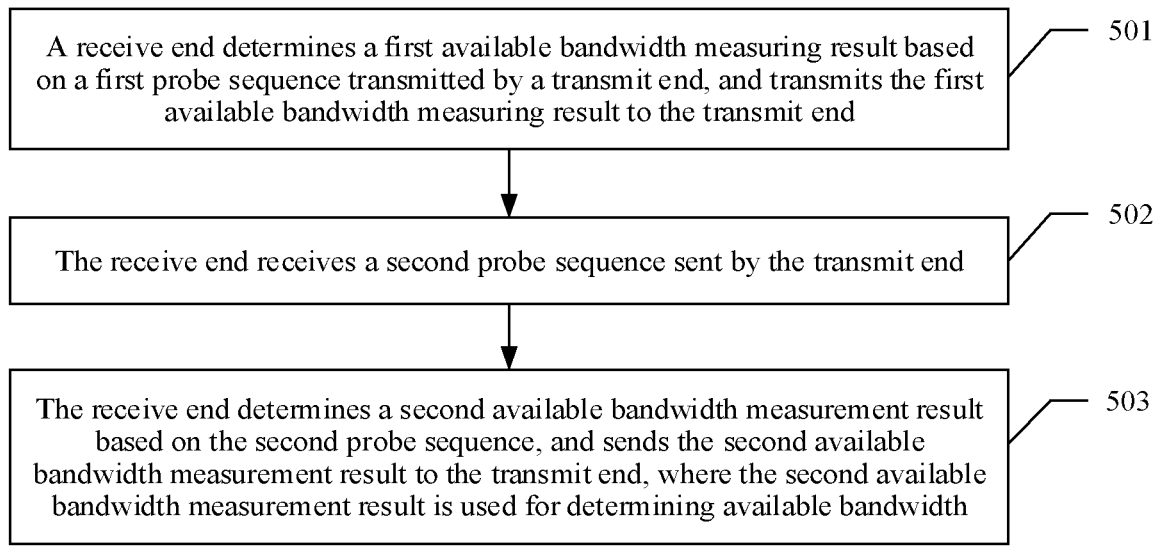
FIG. 5 is a schematic diagram of another embodiment of a method for measuring available bandwidth according to an embodiment of this application.

The foregoing describes the method for measuring available bandwidth from the perspective of the transmit end of the link, and the following describes the method from the perspective of the receive end. FIG. 5 is a schematic diagram of another embodiment of a method for measuring available bandwidth according to an embodiment of this application.

501. A receive end determines a first available bandwidth measurement result based on a first probe sequence sent by a transmit end, and sends the first available bandwidth measurement result to the transmit end.

After receiving the first probe sequence sent by the transmit end, the receive end records a receiving moment of each probe packet, and calculates a one-way delay of the probe packet based on a sending timestamp carried in the probe packet and the receiving moment. The receive end searches for a turning point of one-way delays from being stable to being increasing by determining a variation tendency of delays, and uses a sending rate of a probe packet corresponding to the turning point as the first available bandwidth measurement result of a link, and the receive end sends the available bandwidth measurement result to the transmit end.

502. The receive end receives a second probe sequence sent by the transmit end.

The receive end receives the second probe sequence sent by the transmit end. The second probe sequence includes a group of probe packets with increasing sending rates. A range of the sending rates of the second probe sequence is the same as a range of the sending rates of the first probe sequence. Optionally, the second probe sequence includes an accurate probe sequence and an inaccurate probe sequence, where an increasing speed of sending rates of the accurate probe sequence is less than an increasing speed of sending rates of the inaccurate probe sequence. Optionally, the accurate probe sequence includes a plurality of probe packets with sending rates that geometrically increase at a first common ratio γ1, and the inaccurate probe sequence includes a plurality of probe packets with sending rates that geometrically increase at a second common ratio γ2, where γ1 is less than γ2. Optionally, the accurate probe sequence includes a plurality of probe packets with sending rates that arithmetically increase at a first common difference d1, and the inaccurate probe sequence includes a plurality of probe packets with sending rates that arithmetically increase at a second common difference d2, where d1 is less than d2.

503. The receive end determines a second available bandwidth measurement result based on the second probe sequence, and sends the second available bandwidth measurement result to the transmit end.

After receiving the second probe sequence sent by the transmit end, the receive end records a receiving moment of each probe packet, and calculates a one-way delay of the probe packet based on a sending timestamp carried in the probe packet and the receiving moment. The receive end searches for a turning point of one-way delays from being stable to being increasing by determining a variation tendency of delays, and uses a sending rate of a probe packet corresponding to the turning point as the second available bandwidth measurement result of the link, and the receive end sends the second available bandwidth measurement result to the transmit end. The second available bandwidth measurement result is used for determining the available bandwidth.

It should be noted that, the receive end may repeatedly perform step 503, in other words, receive a plurality of probe sequences sent by the transmit end to obtain available bandwidth measurement results, and return the available bandwidth measurement results to the transmit end. A specific quantity of times of execution is not limited herein.

In the method for measuring available bandwidth provided in this embodiment of this application, the range of the sending rates of the second probe sequence obtained by the receive end is the same as the range of the sending rates of the first probe sequence, and the transmit end does not adjust the range of the sending rates of the probe sequence based on the available bandwidth measurement result. Therefore, even if in a scenario in which background traffic changes relatively fiercely, a case in which a range of sending rates of a probe sequence deviates from real available bandwidth can be avoided, thereby improving probing accuracy. Moreover, a probe sequence may further include an accurate probe interval determined in the probe sequence based on an available bandwidth measurement result, to improve measurement precision. Therefore, this solution can ensure the measurement accuracy in a scenario in which background traffic changes relatively fiercely.

Figure 6:
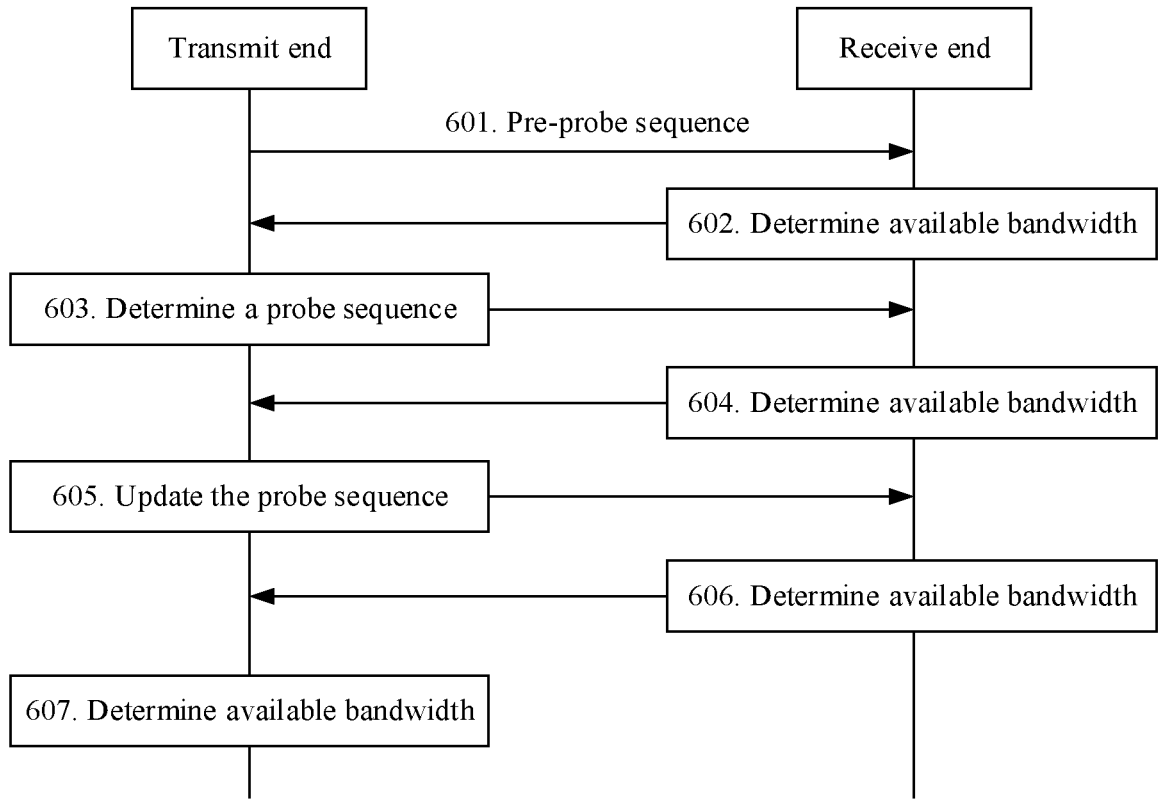
FIG. 6 is an interaction flowchart of a method for measuring available bandwidth according to an embodiment of this application.

FIG. 6 is an interaction flowchart of a method for measuring available bandwidth according to an embodiment of this application.

601. A transmit end sends a probe sequence to a receive end.

To measure the available bandwidth, the transmit end sends the probe sequence to the receive end. The probe sequence is a group of probe packets with variable rates, and is usually a group of probe packets with increasing sending rates. A probe packet carries a sending timestamp. A first probe sequence is used for determining a first available bandwidth measurement result. There is a plurality of manners in which sending rates of probe packets in a probe sequence increase. Optionally, sizes of the probe packets in the probe sequence are the same, and packet sending intervals gradually decrease. To be specific, the sending rates of the probe packets gradually increase. Optionally, the sending rates of the probe packets geometrically increase. A common ratio is a spread factor γ, and γ is a number greater than 1, and a specific value is not limited herein. For example, γ may be 1.1 or 1.2. Optionally, the sending rates of the probe packets arithmetically increase, and a common different d is a positive number.

For example, a range of the sending rates of the probe sequence is 10 megabits per second (Mbps) to 50 Mbps. To be specific, a lower limit L of a sending rate is 10 Mbps, and an upper limit H of a sending rate is 50 Mbps. If γ is 1.2, the transmit end may determine that there are a total of 10 probe packets in the probe sequence, and sending rates of the 10 probe packets are respectively: a sending rate (bw1) of a first probe packet is 10 Mbps, a sending rate (bw2) of a second probe packet is 10×1.2=12 Mbps, and similarly, sending rates of a third probe packet to a tenth probe packet are respectively: bw3=14.4 Mbps, bw4=17.27 Mbps, bw5=20.7 Mbps, bw6=24.8 Mbps, bw7=29.8 Mbps, bw8=35.8 Mbps, bw9=42.9 Mbps, and bw1 0=51.59 Mbps.

It may be understood that there may be different implementations of a process of determining a sending rate of each probe packet based on the range of the sending rates of the probe sequence. The foregoing tenth probe packet is a first probe packet whose sending rate exceeds the range of the sending rates of the probe sequence. In an actual application process, the tenth probe packet may be sent, or may not be sent. This is not limited herein.

The upper limit of a sending rate may be determined based on theoretical available bandwidth of a link. For example, if available bandwidth measurement is performed on a link with a bandwidth of 50 Mbps, H may be set to 50 Mbps. The lower limit L of a sending rate may be a relatively small value. For example, L is 0 or 1.5. This is not limited herein. It may be understood that a value of the available bandwidth falls within the range of the sending rates of the probe sequence.

It may be understood that, to measure the available bandwidth of the link, the transmit end may send a plurality of probe sequences to the receive end. In this step, the probe sequence sent by the transmit end to the receive end may be any probe sequence in a measurement process. This is not limited herein.

602. The receive end determines an available bandwidth measurement result, and sends the available bandwidth measurement result to the transmit end.

The receive end receives the probe sequence, and records a receiving moment of each probe packet. The receive end calculates a one-way delay of each probe packet based on a sending timestamp carried in the probe packet and the receiving moment of the probe packet. A turning point of one-way delays from being stable to being increasing is searched for by determining a variation tendency of delays, and a sending rate of a probe packet corresponding to the turning point is used as an available bandwidth measurement result of the link, and the receive end sends the available bandwidth measurement result to the transmit end.

Optionally, the receive end may determine whether there is a packet loss in the probe sequence. If there is a packet loss in the probe sequence, packet loss processing is performed. Optionally, the receive end may perform false congestion protrusion recognition and true congestion point search on the probe sequence.

603. The transmit end determines a probe sequence and sends the probe sequence to the receive end.

After receiving the available bandwidth measurement result, the transmit end determines, based on the available bandwidth measurement result, the probe sequence for next measurement. To be specific, the transmit end determines sending rates of probe packets in the next probe sequence. The probe sequence is used for determining an available bandwidth measurement result. A range of sending rates of the probe sequence is the same as the range of the sending rates of the last probe sequence. In other words, values of L and H remain unchanged. The transmit end determines an accurate probe sequence and an inaccurate probe sequence from the probe sequence based on the available bandwidth measurement result.

Optionally, an increasing speed of sending rates of the accurate probe sequence is less than an increasing speed of sending rates of the inaccurate probe sequence. To be specific, a probe density of the accurate probe sequence is greater than a probe density of the inaccurate probe sequence.

Optionally, the accurate probe sequence includes a plurality of probe packets with sending rates that geometrically increase at a first common ratio $\gamma 1$, and the inaccurate probe sequence includes a plurality of probe packets with sending rates that geometrically increase at a second common ratio $\gamma 2$, where $\gamma 1$ is less than $\gamma 2$. In other words, the spread factor $\gamma 1$ of the sending rates of the accurate probe sequence is less than the spread factor $\gamma 2$ of the sending rates of the inaccurate probe sequence. For example, $\gamma 1$ is 1.1, and $\gamma 2$ is 1.2.

Optionally, the accurate probe sequence includes a plurality of probe packets with sending rates that arithmetically increase at a first common difference d1, and the inaccurate probe sequence includes a plurality of probe packets with sending rates that arithmetically increase at a second common difference d2, where d1 is less than d2. For example, d1 is 1 Mbps, and d2 is 2 Mbps.

Optionally, the range of the sending rates of the accurate probe sequence includes the first available bandwidth measurement result.

Optionally, the accurate probe sequence is a plurality of probe packets with the sending rate range taking the first available bandwidth measurement result as a middle point. An upper limit and a lower limit of a sending rate of the accurate probe sequence are respectively denoted as HAB_low and HAB_high, which can be calculated by using the following formulas:

$$\text{HAB\_low} = \text{ABW}_{feedback} \times (1-p), \text{ and}$$

$$\text{HAB\_high} = \text{ABW}_{feedback} \times (1+p),$$

where $\text{ABW}_{feedback}$ is the first available bandwidth measurement result, p is a constant greater than 0 and less than 1, and determines a size of a window of the range of the sending rates of the accurate probe sequence. For example, p may be 0.2 or 0.3.

For example, if $\text{ABW}_{feedback}$ is 30 Mbps and p is 0.2, the following calculation may be performed: HAB_low=30×(1−0.2)=24 Mbps, and HAB_high=30×(1+0.2)=36 Mbps. In other words, the range of the sending rates of the accurate probe sequence is 24 Mbps to 36 Mbps.

It may be understood that, if HAB_high obtained through calculation is greater than H, H may be used as the upper limit of the sending rate of the accurate probe sequence.

The spread factor $\gamma 1$ of the sending rates of the accurate probe sequence is 1.1, and the spread factor $\gamma 2$ of the sending rates of the inaccurate probe sequence is 1.2, so that the sending rates of the probe packets in the probe sequence may be further determined: bw1=10 Mbps, bw2=12 Mbps, bw3=14.4 Mbps, bw4=17.28 Mbps, bw5=20.7 Mbps, and bw6=24.88 Mbps. Because bw6 falls into the range of the sending rates of the accurate probe sequence, the spread factor $\gamma 1$ is applied to determine a sending rate of a next probe packet: bw7=24.88×1.1=27.37 Mbps. Similarly, bw8=30.1 Mbps, bw9=33.1 Mbps, and bw10=36.4 Mbps. Because bw10 exceeds the range of the sending rates of the accurate probe sequence, the spread factor $\gamma 2$ is applied to determine a sending rate of a next probe packet. The following calculation is performed: bw11=43.71 Mbps, and bw12=52.46 Mbps.

After determining the sending rates of the probe packets, the transmit end may send the probe sequence to the receive end. A probe packet carries a sending timestamp.

604. The receive end determines an available bandwidth measurement result, and sends the available bandwidth measurement result to the transmit end.

Step 604 is similar to step 602, and details are not described herein again.

605. The transmit end updates the probe sequence and sends the updated probe sequence to the receive end.

After obtaining the available bandwidth measurement result sent by the receive end, the transmit end may update the probe sequence. To be specific, the transmit end redetermines a probe sequence for next measurement based on the available bandwidth measurement result obtained through last measurement. A range of sending rates of the probe sequence is the same as the range of the sending rates of the last probe sequence. In other words, values of L and H remain unchanged. The probe sequence is used for determining an available bandwidth measurement result. Further, the range of the sending rates of the accurate probe sequence may be recalculated based on the available bandwidth measurement result.

For example, if the available bandwidth measurement result is 35 Mbps, it may be obtained through calculation that an accurate measurement interval is 28 Mbps to 42 Mbps. Similar to the calculation method in step 603, sending rates of probe packets in the next probe sequence may be recalculated, and the updated probe sequence is sent to the receive end.

606. The receive end determines an available bandwidth measurement result, and sends the available bandwidth measurement result to the transmit end.

Step 606 is similar to step 602, and details are not described herein again.

It should be noted that step 605 to step 606 may be repeatedly performed for a plurality of times, and a specific quantity of times is not limited herein.

607. The transmit end obtains the available bandwidth.

The available bandwidth may be determined based on the plurality of available bandwidth measurement results.

Optionally, the transmit end determines the available bandwidth based on a statistical value of the plurality of available bandwidth measurement results. Optionally, the transmit end receives the available bandwidth sent by the receive end, where the available bandwidth is determined by the receive end based on the plurality of available bandwidth measurement results. A specific manner of obtaining the available bandwidth is not limited herein.

Optionally, the plurality of available bandwidth measurement results may be all available bandwidth measurement results, or may be all available bandwidth measurement results except the first available bandwidth measurement result, or may be a preset quantity of a plurality of available bandwidth measurement results obtained most recently. This is not limited herein.

Optionally, determining the available bandwidth based on the statistical value of the plurality of available bandwidth measurement results may be directly using the statistical value of the plurality of available bandwidth measurement results as the available bandwidth, where the statistical value includes a median value, an average value, or the like, or correcting the statistical value of the plurality of available bandwidth measurement results, and using a value obtained after correction as the available bandwidth, where a correction method is, for example, multiplying the statistical value by a correction coefficient or adding a correction value to the statistical value, and this is not limited herein.

For example, the available bandwidth may be determined based on n available bandwidth measurement results and a t-distribution method that includes calculating an average value $\bar{x}$ and a standard deviation s of the n available bandwidth measurement results, calculating a degree of freedom, which is n−1, looking up in a T table for a corresponding t value based on a preset confidence and the degree of freedom, and performing calculation based on a formula $$\bar{X} \pm t \frac{s}{\sqrt{n}},$$

to obtain a confidence interval of the available bandwidth, and using a lower limit of the confidence interval as the available bandwidth.

Optionally, when a preset probe stop condition is met, the transmit end may determine the available bandwidth of the link based on the available bandwidth measurement results. The preset probe stop condition may be probe duration of the probe sequences sent by the transmit end reaches a first preset threshold, a quantity of available bandwidth measurement results obtained by the transmit end reaches a second preset threshold, a difference between two successive available bandwidth measurement results is less than a third preset threshold, or a variance of a preset quantity of a plurality of successive available bandwidth measurement results is less than a fourth preset threshold, or the like. A specific probe stop condition is not limited herein.

In the method for measuring available bandwidth provided in this embodiment of this application, the range of the sending rates of the second probe sequence sent by the transmit end to the receive end is the same as the range of the sending rates of the first probe sequence, and the range of the sending rates of the probe sequence is not adjusted based on the available bandwidth measurement result. Therefore, even if in a scenario in which background traffic changes relatively fiercely, a case in which a range of sending rates of a probe sequence deviates from real available bandwidth can be avoided, thereby improving probing accuracy. Moreover, a probe sequence may further include an accurate probe interval determined based on an available bandwidth measurement result, to improve measurement precision. Therefore, this solution can ensure the measurement accuracy in a scenario in which background traffic changes relatively fiercely.

Figure 7:
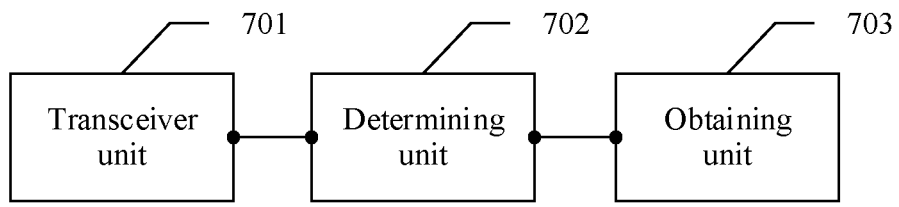
FIG. 7 is a schematic diagram of an embodiment of a communications apparatus according to an embodiment of this application.

The foregoing describes the method for measuring available bandwidth, and the following describes an apparatus for implementing the method for measuring available bandwidth. FIG. 7 is a schematic diagram of an embodiment of a communications apparatus according to an embodiment of this application.

The communications apparatus provided in this embodiment is a transmit end of a network link whose available bandwidth is to be measured. The communications apparatus may be a router, a gateway, a server, or the like. A specific form of the device is not limited in this embodiment of this application.

The communications apparatus provided in this embodiment of this application includes a transceiver unit 701, a determining unit 702, and an obtaining unit 703.

The transceiver unit 701 is configured to send a first probe sequence to a receive end, and receive a first available bandwidth measurement result returned by the receive end, where the first probe sequence includes a group of probe packets with increasing sending rates, and the first probe sequence is used for determining the first available bandwidth measurement result.

The determining unit 702 is configured to determine a second probe sequence based on the first available bandwidth measurement result, where the second probe sequence includes a group of probe packets with increasing sending rates, a range of the sending rates of the second probe sequence is the same as a range of the sending rates of the first probe sequence, and the second probe sequence is used for determining a second available bandwidth measurement result.

The transceiver unit 701 is further configured to send the second probe sequence to the receive end, and receive the second available bandwidth measurement result returned by the receive end.

The obtaining unit 703 configured to obtain the available bandwidth, where the available bandwidth is determined based on the second available bandwidth measurement result.

The determining unit 702 is further configured to determine the second probe sequence including an accurate probe sequence and an inaccurate probe sequence based on the first available bandwidth measurement result. An increasing speed of sending rates of the accurate probe sequence is less than an increasing speed of sending rates of the inaccurate probe sequence.

The determining unit 702 is further configured to determine a third probe sequence based on the second available bandwidth measurement result. A range of sending rates of the third probe sequence is the same as the range of the sending rates of the first probe sequence. The third probe sequence is used for determining a third available bandwidth measurement result. The transceiver unit 701 is further configured to send the third probe sequence to the receive end, and receive the third available bandwidth measurement result returned by the receive end. The third available bandwidth measurement result is used for determining the available bandwidth.

The determining unit 702 is further configured to determine the available bandwidth based on a statistical value of the plurality of available bandwidth measurement results returned by the receive end, or the transceiver unit 701 is further configured to receive the available bandwidth sent by the receive end, where the available bandwidth is determined based on the statistical value of the plurality of available bandwidth measurement results.

The determining unit 702 is further configured to determine, by the transceiver unit, the available bandwidth when a preset probe stop condition is met. The preset probe stop condition includes probe duration of the probe sequences sent by the transceiver unit reaches a first preset threshold, a quantity of available bandwidth measurement results obtained by the transceiver unit reaches a second preset threshold, a difference between two successive available bandwidth measurement results is less than a third preset threshold, or a variance of a preset quantity of a plurality of successive available bandwidth measurement results is less than a fourth preset threshold.

Figure 8:
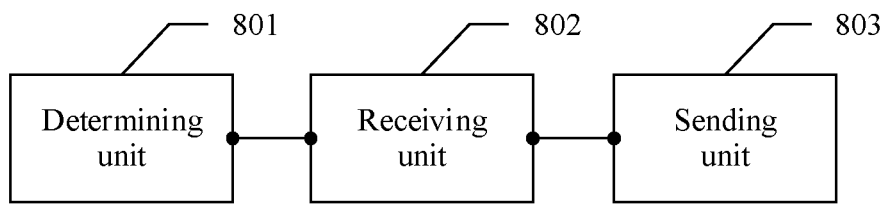
FIG. 8 is a schematic diagram of another embodiment of a communications apparatus according to an embodiment of this application.

FIG. 8 is a schematic diagram of another embodiment of a communications apparatus according to an embodiment of this application. The communications apparatus provided in this embodiment is a receive end of a network link whose available bandwidth is to be measured. The communications apparatus may be a router, a gateway, a server, or the like. A specific form of the device is not limited in this embodiment of this application.

The communications apparatus provided in this embodiment includes a determining unit 801, a receiving unit 802, and a sending unit 803.

The determining unit 801 is configured to determine a first available bandwidth measurement result based on a first probe sequence sent by a transmit end, and send the first available bandwidth measurement result to the transmit end, where the first probe sequence includes a group of probe packets with increasing sending rates, and the first available bandwidth measurement result is used for determining a second probe sequence.

The receiving unit 802 is configured to receive the second probe sequence sent by the transmit end, where the second probe sequence includes a group of probe packets with increasing sending rates, and a range of the sending rates of the second probe sequence is the same as a range of the sending rates of the first probe sequence.

The determining unit 801 is further configured to determine a second available bandwidth measurement result based on the second probe sequence.

The sending unit 803 is configured to send the second available bandwidth measurement result to the transmit end, where the second available bandwidth measurement result is used for determining the available bandwidth.

The receiving unit 802 is further configured to receive the second probe sequence including an accurate probe sequence and an inaccurate probe sequence. An increasing speed of sending rates of the accurate probe sequence is less than an increasing speed of sending rates of the inaccurate probe sequence.

The receiving unit 802 is further configured to receive a third probe sequence sent by the transmit end. The third probe sequence is determined based on the second available bandwidth measurement result. A range of sending rates of the third probe sequence is the same as the range of the sending rates of the first probe sequence. The determining unit 801 is further configured to determine a third available bandwidth measurement result based on the third probe sequence. The sending unit 803 is further configured to send the third available bandwidth measurement result to the transmit end. The third available bandwidth measurement result is used for determining the available bandwidth.

The determining unit 801 is further configured to determine the available bandwidth based on a statistical value of the plurality of available bandwidth measurement results, and send the available bandwidth to the transmit end.

The determining unit 801 is further configured to determine, by the transmit end, the available bandwidth based on the statistical value of the plurality of available bandwidth measurement results when a preset probe stop condition is met. The preset probe stop condition includes probe duration of the probe sequences sent by the transmit end reaches a first preset threshold, a quantity of available bandwidth measurement results obtained by the transmit end reaches a second preset threshold, a difference between two successive available bandwidth measurement results is less than a third preset threshold, or a variance of a preset quantity of a plurality of successive available bandwidth measurement results is less than a fourth preset threshold.

Figure 9:
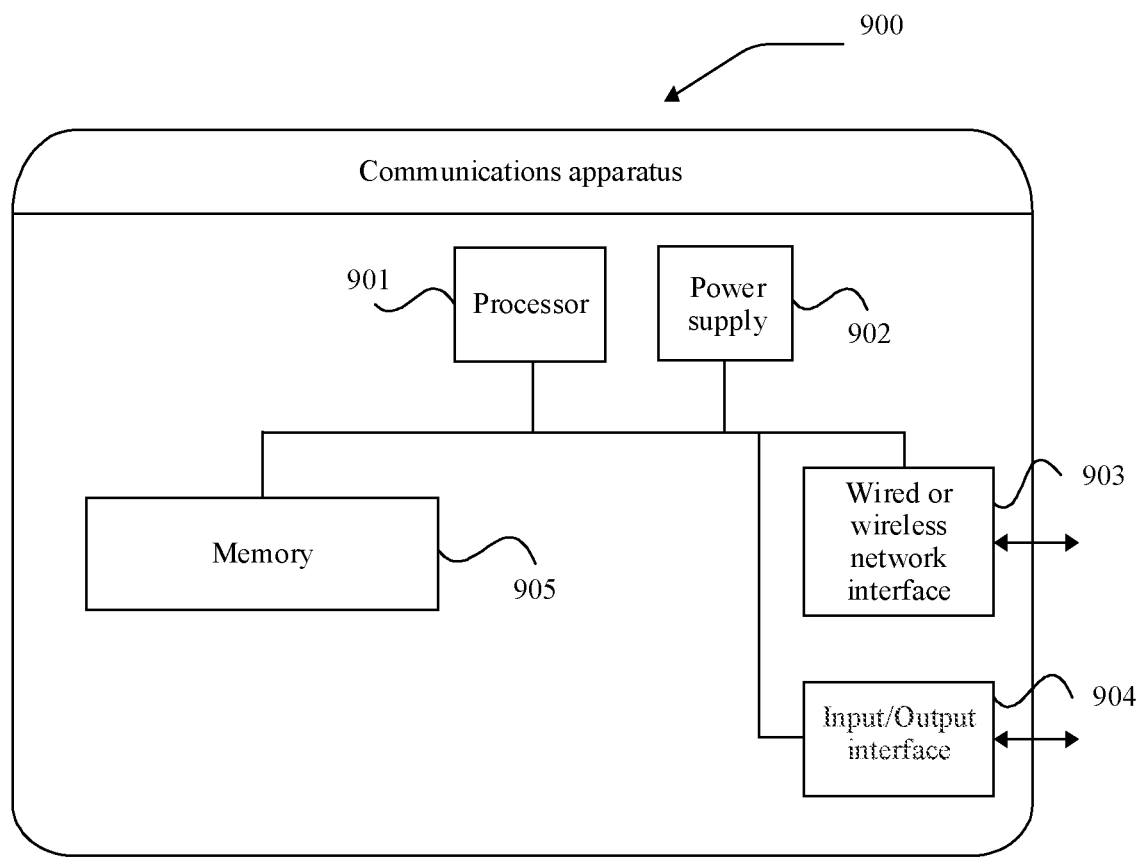
FIG. 9 is a schematic diagram of another embodiment of a communications apparatus according to an embodiment of this application.

FIG. 9 is a schematic diagram of another embodiment of a communications apparatus according to an embodiment of this application. The communications apparatus provided in this embodiment is a transmit end of a network link whose available bandwidth is to be measured. The communications apparatus may be a router, a gateway, a server, or the like. A specific form of the device is not limited in this embodiment of this application.

The communications apparatus 900 may vary greatly due to different configurations or performance, and may include one or more processors 901 and memories 905. The memory 905 stores programs or data.

The memory 905 may be a volatile memory or a non-volatile memory. The processor 901 may communicate with the memory 905, and the communications apparatus 900 executes a series of instructions in the memory 905. It may be understood that, if the processor 901 is an application-specific integrated circuit (ASIC) chip that can store instructions, or the like, the memory 905 may not exist.

The communications apparatus 900 may further include one or more power supplies 902, one or more wired or wireless network interfaces 903, such as an Ethernet interface, and one or more input/output interfaces 904. The input/output interface 904 may be configured to connect to a display, a mouse, a keyboard, a touchscreen device, a sensing device, or the like. The input/output interface 904 is an optional component, and may or may not exist. This is not limited herein.

For a procedure executed by the processor 901 in the communications apparatus 900 in this embodiment, refer to the method procedures described in the foregoing method embodiments. Details are not described herein again.

Figure 10:
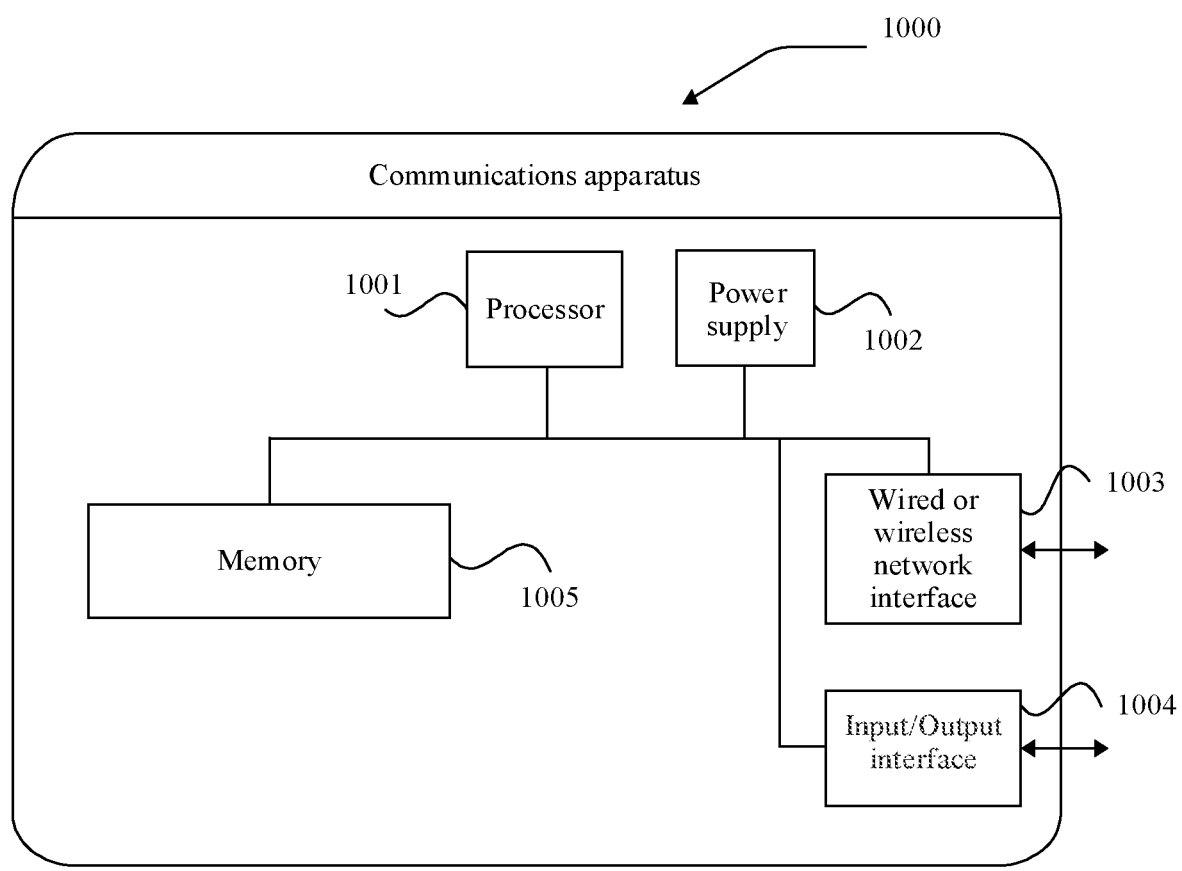
FIG. 10 is a schematic diagram of another embodiment of a communications apparatus according to an embodiment of this application.

FIG. 10 is a schematic diagram of another embodiment of a communications apparatus according to an embodiment of this application. The communications apparatus provided in this embodiment is a receive end of a network link whose available bandwidth is to be measured. The communications apparatus may be a router, a gateway, a server, or the like. A specific form of the device is not limited in this embodiment of this application.

The communications apparatus 1000 may vary greatly due to different configurations or performance, and may include one or more processors 1001 and memories 1005. The memory 1005 stores programs or data.

The memory 1005 may be a volatile memory or a nonvolatile memory. The processor 1001 may communicate with the memory 1005, and the communications apparatus 1000 executes a series of instructions in the memory 1005. It may be understood that, if the processor 1001 is an ASIC chip that can store instructions, or the like, the memory 1005 may not exist.

The communications apparatus 1000 may further include one or more power supplies 1002, one or more wired or wireless network interfaces 1003, such as an Ethernet interface, and one or more input/output interfaces 1004. The input/output interface 1004 may be configured to connect to a display, a mouse, a keyboard, a touchscreen device, a sensing device, or the like. The input/output interface 1004 is an optional component, and may or may not exist. This is not limited herein.

For a procedure executed by the processor 1001 in the communications apparatus 1000 in this embodiment, refer to the method procedures described in the foregoing method embodiments. Details are not described herein again.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A method implemented by a transmit end, comprising:
   sending, to a receive end, a first probe sequence comprising a first group of probe packets with increasing first sending rates, wherein the first probe sequence is for determining a first available bandwidth measurement result;
   receiving, from the receive end, the first available bandwidth measurement result;
   determining, based on the first available bandwidth measurement result, a second probe sequence comprising a second group of probe packets with increasing second sending rates, wherein a second range of the second sending rates is the same as a first range of the first sending rates, wherein the second probe sequence is for determining a second available bandwidth measurement result, wherein the second probe sequence further comprises an accurate probe sequence and an inaccurate probe sequence, and wherein a first increasing speed of third sending rates of the accurate probe sequence is less than a second increasing speed of fourth sending rates of the inaccurate probe sequence;
   sending, to the receive end, the second probe sequence;
   receiving, from the receive end, the second available bandwidth measurement result; and
   obtaining an available bandwidth based on the second available bandwidth measurement result.

2. The method of claim 1, wherein after receiving the second available bandwidth measurement result, the method further comprises:
   determining, based on the second available bandwidth measurement result, a third probe sequence to determine a third available bandwidth measurement result, wherein a third range of third sending rates of the third probe sequence is the same as the first range;
   sending the third probe sequence to the receive end; and
   receiving, from the receive end, the third available bandwidth measurement result to determine the available bandwidth.

3. The method of claim 1, wherein the available bandwidth comprises:
   determining, based on a statistical value of a plurality of available bandwidth measurement results received from the receive end, the available bandwidth; or
   receiving, from the receive end, the available bandwidth that is based on the statistical value.

4. The method of claim 3, further comprising further determining the available bandwidth when a preset probe stop condition is met, wherein the preset probe stop condition comprises:
   probe durations of probe sequences sent by the transmit end reaching a first preset threshold;

a quantity of available bandwidth measurement results obtained by the transmit end reaching a second preset threshold;
a difference between two successive available bandwidth measurement results being less than a third preset threshold; or
a variance of a preset quantity of a plurality of successive available bandwidth measurement results being less than a fourth preset threshold.

5. A method implemented by a receive end, comprising:
receiving, from a transmit end, a first probe sequence comprising a first group of probe packets with increasing first sending rates;
determining, based on the first probe sequence, a first available bandwidth measurement result;
sending the first available bandwidth measurement result to the transmit end to determine a second probe sequence;
receiving, from the transmit end, the second probe sequence comprising a second group of probe packets with increasing second sending rates, wherein a second range of the second sending rates is the same as a first range of the first sending rates, wherein the second probe sequence further comprises an accurate probe sequence and an inaccurate probe sequence, and wherein a first increasing speed of third sending rates of the accurate probe sequence is less than a second increasing speed of fourth sending rates of the inaccurate probe sequence;
determining, based on the second probe sequence, a second available bandwidth measurement result; and
sending, to the transmit end, the second available bandwidth measurement result to determine available bandwidth.

6. The method of claim 5, wherein after determining the second available bandwidth measurement result and sending the second available bandwidth measurement result, the method further comprises:
receiving, from the transmit end and based on the second available bandwidth measurement result, a third probe sequence, wherein a third range of third sending rates of the third probe sequence is the same as the first range;
determining, based on the third probe sequence, a third available bandwidth measurement result; and
sending the third available bandwidth measurement result to the transmit end to determine the available bandwidth.

7. The method of claim 5, further comprising:
further determining the available bandwidth based on a statistical value of a plurality of available bandwidth measurement results; and
sending the available bandwidth to the transmit end.

8. The method of claim 7, further comprising further determining the available bandwidth based on the statistical value when a preset probe stop condition is met, wherein the preset probe stop condition comprises:
probe durations of probe sequences from the transmit end reaching a first preset threshold;
a quantity of available bandwidth measurement results of the transmit end reaching a second preset threshold;
a difference between two successive available bandwidth measurement results is less than a third preset threshold; or
a variance of a preset quantity of a plurality of successive available bandwidth measurement results is less than a fourth preset threshold.

9. A communications device, comprising:
a memory configured to store programming instructions; and
a processor coupled to the memory, wherein the programming instructions cause the processor to be configured to:
send, to a receive end, a first probe sequence comprising a first group of probe packets with increasing first sending rates, wherein the first probe sequence is for determining a first available bandwidth measurement result;
receive, from the receive end, the first available bandwidth measurement result;
determine, based on the first available bandwidth measurement result, a second probe sequence comprising a second group of probe packets with increasing second sending rates, wherein a second range of the second sending rates is the same as a first range of the first sending rates, wherein the second probe sequence is for determining a second available bandwidth measurement result, wherein the second probe sequence further comprises an accurate probe sequence and an inaccurate probe sequence, and wherein a first increasing speed of third sending rates of the accurate probe sequence is less than a second increasing speed of fourth sending rates of the inaccurate probe sequence;
send, to the receive end, the second probe sequence;
receive, from the receive end, the second available bandwidth measurement result; and
obtain available bandwidth based on the second available bandwidth measurement result.

10. The communications device of claim 9, wherein the programming instructions further cause the processor to be configured to:
determine, based on the second available bandwidth measurement result, a third probe sequence to determine a third available bandwidth measurement result, wherein a third range of third sending rates of the third probe sequence is the same as the first range;
send the third probe sequence to the receive end; and
receive, from the receive end, the third available bandwidth measurement result to determine the available bandwidth.

11. The communications device of claim 9, wherein the programming instructions further cause the processor to be configured to:
determine, based on a statistical value of a plurality of available bandwidth measurement results received from the receive end, the available bandwidth; or
receive, from the receive end, the available bandwidth that is based on the statistical value.

12. The communications device of claim 11, wherein the programming instructions further cause the processor to be configured to further determine the available bandwidth when a preset probe stop condition is met, and wherein the preset probe stop condition comprises:
probe durations of probe sequences sent by the communications device reaching a first preset threshold;
a quantity of available bandwidth measurement results obtained by the communications device reaching a second preset threshold;
a difference between two successive available bandwidth measurement results is less than a third preset threshold; or a variance of a preset quantity of a plurality of successive available bandwidth measurement results is less than a fourth preset threshold.

13. A communications device, comprising:

a memory configured to store programming instructions; and a processor coupled to the memory, wherein the programming instructions cause the processor to be configured to:

receive, from a transmit end, a first probe sequence comprising a first group of probe packets with increasing first sending rates;

determine a first available bandwidth measurement result based on the first probe sequence;

send the first available bandwidth measurement result to the transmit end to determine a second probe sequence, wherein the second probe sequence further comprises an accurate probe sequence and an inaccurate probe sequence, and wherein a first increasing speed of third sending rates of the accurate probe sequence is less than a second increasing speed of fourth sending rates of the inaccurate probe sequence;

receive, from the transmit end, the second probe sequence comprising a second group of probe packets with increasing second sending rates, wherein a second range of the second sending rates is the same as a first range of the first sending rates;

determine, based on the second probe sequence, a second available bandwidth measurement result; and send, to the transmit end, the second available bandwidth measurement result to determine available bandwidth.

14. The communications device of claim 13, wherein the programming instructions further cause the processor to be configured to:

receive, from the transmit end and based on the second available bandwidth measurement result, a third probe sequence, wherein a third range of third sending rates of the third probe sequence is the same as the first range;

determine a third available bandwidth measurement result based on the third probe sequence; and send the third available bandwidth measurement result to the transmit end to determine the available bandwidth.

15. The communications device of claim 13, wherein the programming instructions further cause the processor to be configured to:

further determine the available bandwidth based on a statistical value of a plurality of available bandwidth measurement results; and send the available bandwidth to the transmit end.

16. The communications device of claim 15, wherein the programming instructions further cause the processor to be configured to further determine the available bandwidth based on the statistical value when a preset probe stop condition is met, and wherein the preset probe stop condition comprises:

probe duration of probe sequences sent by the transmit end reaching a first preset threshold;

a quantity of available bandwidth measurement results obtained by the transmit end reaching a second preset threshold;

a difference between two successive available bandwidth measurement results is less than a third preset threshold; or a variance of a preset quantity of a plurality of successive available bandwidth measurement results is less than a fourth preset threshold.

\* \* \* \* \*